Dec. 10, 1968 W. A. GUTIERREZ ET AL 3,415,678
PROCESS FOR PRODUCING THIN FILM RECTIFYING JUNCTIONS
WITH GRADED CdSe-ZnSe FILM
Filed May 26, 1966
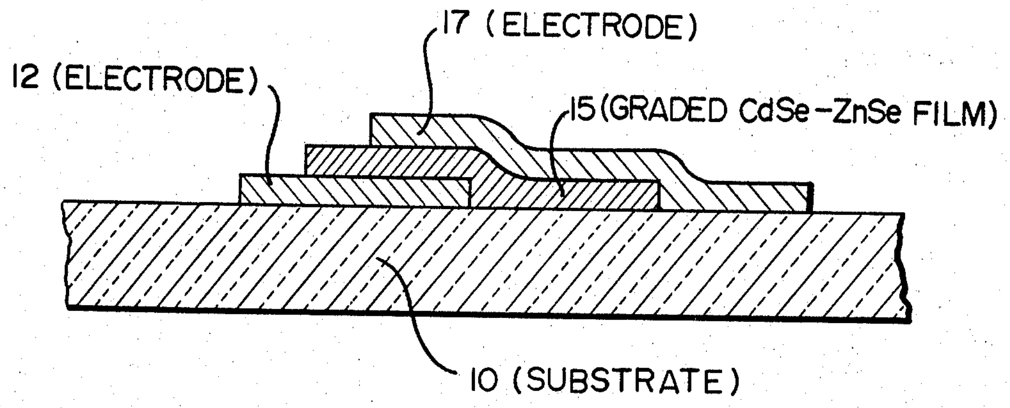
INVENTORS
WILLIAM A. GUTIERREZ
& HERBERT L. WILSON
BY Hurvitz & Rose
ATTORNEYS United States Patent Office 3,415,678

Patented Dec. 10, 1968

3,415,678

PROCESS FOR PRODUCING THIN FILM RECTIFYING JUNCTIONS WITH GRADED CdSe-ZnSe FILM

William A. Gutierrez, Alexandria, and Herbert L. Wilson, Arlington, Va., assignors to Melpar, Inc., Falls Church, Va., a corporation of Delaware Filed May 26, 1966, Ser. No. 553,187
5 Claims. (Cl. 117—200)

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present invention relates generally to thin film devices, and more particularly to thin film rectifying junctions and methods for forming same.

The two methods in common use for forming rectifying junctions are (1) fabricating a metal-insulator-semiconductor-metal structure, and (2) fabricating a metal N-type semiconductor P-type semiconductor structure. In each of these methods there is inherent a basic disadvantage of incompatibility with the fabrication of other thin film elements, and hence, undesirable complexity in the formation of circuits composed entirely of thin-film components. Proper functioning of rectifiers fabricated by the first method requires the formation of extremely thin, pinhole-free insulators, which are relatively difficult to produce by conventional vacuum deposition techniques. An alternative is to thermally grow an oxide on the first metal layer, but again, difficulty is encountered in reproducibility and in compatibility with the formation of other thin-film components.

The second method usually requires heating of the N-type semiconductor in a gaseous atmosphere in order to achieve the desired properties, and is consequently inconsistent with attempts to fabricate the rectifiers entirely by vacuum evaporation techniques. Moreover, rectifiers produced by the second method utilize both P and N type semiconductors; hence, the storage of minority carriers imposes a severe limit on their speed of response.

Accordingly, it is a principal object of the present invention to provide improved methods of forming thin-film rectifying junctions.

Another object of the invention is to provide metal-semiconductor junctions of the Schottky barrier type by vacuum deposition processes.

Still another object of the present invention is to provide methods of forming thin-film rectifying junctions, on passive substrates, which exhibit properties including high rectification ratio, low forward bias resistance, low forward breakdown voltage, low reverse bias leakage current, high reverse breakdown voltage, and stable properties under shelf or operational conditions.

Briefly, according to the present invention a thin-film rectifying junction is formed on a passive substrate by vacuum evaporating a graded CdSe-ZnSe film of from 1000 to 30,000 Angstroms thickness between a pair of deposited metallic electrodes, either by evaporating a CdSe-ZnSe mixture from a single source or by evaporating each semiconductor simultaneously from two separate sources. The film is deposited such that the ZnSe concentration is greatest at the boundary where the junction is desired.

The process is compatible with thin-film circuit fabrication techniques since there is no requirement for removal from vacuum environment and heat treating the semiconductor or metal films in gaseous atmosphere as in the prior art methods. As a further consequence there is a corresponding reduction in the complexity of the process of fabrication.

It is therefore a more specific object of the present invention to provide a graded CdSe-ZnSe thin-film rectifier.

A further object of the invention is to provide processes for forming graded CdSe-ZnSe thin-film rectifying junctions wherein grading is achieved by evaporating a CdSe-ZnSe mixture from a single source or by evaporating CdSe and ZnSe simultaneously from two separate sources.

Features and advantages of the present invention further include improvement in operational mechanism (physics) of the rectifier over prior art rectifiers, improved rectifier characteristics and stability, higher rectifier rates and faster recovery times than are achieved with rectifiers fabricated by conventional methods, and reproducibility of rectifier parameters.

These and other objects, features, and attendant advantages of the present invention will become apparent from a consideration of the following detailed description of a preferred embodiment of the rectifying junction and certain exemplary processes for formation thereof. In the accompanying drawing the sole figure illustrates a sectional view of a thin-film rectifier produced in accordance with the invention.

Referring now to one example of a process for forming the thin-film rectifying junction, and with concurrent reference to the drawing, the passive or active substrate 10 is placed in a conventional vacuum evaporation system, various types of which are described extensively in the literature and need not be further discussed in detail here. Suitable insulating materials for the substrate include glass, quartz, alumina, and sapphire. Alternatively, the substrate may be composed of an active material, either metal or semiconductor. For the sake of illustration, each of the processes will be described with reference to the specific use of a glass (e.g., fused silica) substrate.

The vacuum system is preferably maintained at a pressure less than $10^{-4}$ mm. Hg abs. The glass substrate 10 is heated to a temperature of approximately 200° C. and the first metallic electrode 12, normally the ohmic electrode, is deposited to a thickness within the range from 300 to 1000 Angstroms (A.) at a rate of about 100 A./sec. Electrode 12 may be composed of any suitable metal such as gold, copper, or aluminum. In several embodiments of the thin-film rectifying junctions constructed in accordance with the invention, both electrodes were composed of gold, each deposited to a thickness of from 800 to 1000 A.

The semiconductor film 15 is then deposited, using either of two methods to be described presently, at a substrate temperature ranging from 200° C. to 250° C. to a thickness of from 1000 to 30,000 A. at a rate of approximately 1700 A./sec. The deposited semiconductor layer is a gradation of the selenides of cadmium and zinc, graded such that the ZnSe concentration is greatest at the boundary where the junction is desired. The ZnSe concentration may be greatest at the top or the bottom portion of the semiconductor film.

Deposition of the CdSe-ZnSe film may be accomplished either by evaporating a CdSe-ZnSe mixture from a single source, or by evaporating each semiconductor simultaneously from two separate sources. The first of these methods results in a graded semiconductor film because the two constitutents have different heats of sublimation. As the source temperature is increased from room temperature, the constituent with the lower heat of sublimation, CdSe, is deposited first. Continued raising of the source temperature at the desired rate results in the deposition of both constituents with the combination of rate of increase of source temperature and ratio of the two constituents controlling the gradation of the film.

In the second method of depositing the semiconductor film, the CdSe-ZnSe film is graded by controlling the vaporization of each constituent. One constituent is vaporized and deposited first, followed by a co-evaporation of the two constituents, and ending with a stronger deposition (greater concentration) of the second constituent. The resultant film is therefore rich in the first constituent at the substrate interface and tends to be rich in the second constituent at the uppermost boundary (as viewed in the figure). The second method is more flexible than the first in that it permits the greatest concentration of ZnSe at either of these points, as desired.

In the embodiment thus far described, the ZnSe enriched region of the film was deposited at the uppermost boundary. It is to be emphasized that the percentages of the compounds throughout the graded film may be varied by the exercise of appropriate control, either rate of increase of source temperature and/or ratio of the two constituents in the first method or order of vaporization of each constituent in the second method, to obtain the desired characteristics of the rectifier.

Finally a metallic "blocking" contact 17, gold in this embodiment, was evaporated at a substrate temperature of about 50° C. on the ZnSe enriched surface of semiconductor film 15.

In the operation of the thin-film rectifying junction, a potential barrier (Schottky) to the flow of charge carriers is established when one of the metallic electrodes is brought into intimate contact with the ZnSe enriched portion of the semiconductor film, the barrier being increased with one polarity of applied voltage and decreased with applied voltage of the opposite polarity. Hence, the potential barrier impedes or enhances the flow of electrons according to the magnitude and polarity of the barrier established in the region of the metal-to-semiconductor interface, leading to the non-symmetrical current-voltage characteristic of the rectifying junction.

It is to be noted that if the ZnSe concentration is made larger at the interface between film 15 and electrode 17 then any low work-function metal may be utilized for electrode 12 and any high work-function metal employed for electrode 17. For largest ZnSe concentration at the film 15-electrode 12 interface, electrode 17 may constitute a low work-function metal and electrode 12 a high work-function metal. If desired, a metal may be used as the substrate material so that the substrate functions as the lower electrode, thus taking over both of the separate functions of items 10 and 12. In that case, the conditions on the work-function of the metal substrate are the same as those described above in connection with electrode 12.

It will be clear that the present invention is applicable to the production of rectifiers for all thin-film circuits or for hybrid circuits. Moreover, the processes of the invention may be employed to form thin-film rectifying junctions for use as emitter and collector junctions of thin-film metal-base transistors, for use as varactors, for use as photovoltaic cells, or a variety of other applications. Accordingly, while we have disclosed certain preferred embodiments and processes it will be apparent to those skilled in the art that variations in the specific details which have been described and illustrated may be resorted to without departing from the spirit and scope of the invention as defined in the appended claims.

We claim:

1. Process for production of thin film rectifying junctions, comprising vacuum depositing on a metal electrode supported by a substrate a graded CdSe-ZnSe film of desired thickness in the range from approximately 1000 A. to 30,000 A., while maintaining the temperature of said substrate in the range from 200° C. to 250° C., said vacuum depositing being carried out by evaporating a CdSe-ZnSe mixture from a single source at a pressure less than $10^{-4}$ mm. Hg and at an increasing source temperature from the sublimation temperature of CdSe at said pressure to a value sufficient to vaporize the ZnSe, said increase in source temperature performed at a rate to produce a controlled gradation of said film, and vacuum depositing another metal electrode on the surface of the graded film remote from the first-mentioned metal electrode.

2. The process according to claim 1 wherein said first-mentioned metal electrode has a relatively low work function and said another metal electrode has a relatively high work function, the greatest concentration of ZnSe in said graded film thereby occurring along the boundary of said high work function metal electrode, at which the rectifying junction is desired.

3. The process according to claim 1 wherein the gradation of the constituents of said film is further controlled by the ratio of the source constituents.

4. The process according to claim 1 wherein said substrate is glass.

5. The process according to claim 1 wherein each of said electrodes is gold, deposited at a thickness of from about 300 A. to 1000 A.

References Cited

UNITED STATES PATENTS 3,290,568 12/1966 Hershinger ---------- 317—235

OTHER REFERENCES

Physics of Thin Films, article by A. Vecht, pp. 165–174, Academic Press, N.Y., 1966.

JOHN W. HUCKERT, *Primary Examiner.*

M. EDLOW, *Assistant Examiner.*

U.S. Cl. X.R.

317—234, 235; 117—106